US006913241B2

United States Patent
Bernarding et al.

(10) Patent No.: US 6,913,241 B2
(45) Date of Patent: Jul. 5, 2005

(54) ACTUATING DEVICE

(75) Inventors: Eugen Bernarding, Usingen (DE);
Rajko Colic, Bad Homburg (DE);
Thomas Mann, Nidderau (DE)

(73) Assignee: Siemens Aktiengesellschaft, Munich ( * ) Notice: Subject to any disclaimer, the term of this patent is extended or adjusted under 35 U.S.C. 154(b) by 106 days.

(21) Appl. No.: 10/665,491

(22) Filed: Sep. 22, 2003

(65) Prior Publication Data
US 2004/0094102 A1 May 20, 2004

(30) Foreign Application Priority Data
Sep. 20, 2002 (DE) .......................................... 102 43 778

(51) Int. Cl.⁷ ................................................. F16K 1/00
(52) U.S. Cl. .................... 251/129.12; 251/69; 251/288
(58) Field of Search ............................. 251/69, 129.12, 251/286, 288

(56) References Cited

U.S. PATENT DOCUMENTS 6,095,488 A    8/2000  Semeyn, Jr. et al.
6,253,732 B1 * 7/2001  Semeyn et al. ............. 123/396
6,575,427 B1 * 6/2003  Rauch et al. ................. 251/69

FOREIGN PATENT DOCUMENTS

DE    198 49 492 A1   10/1998

OTHER PUBLICATIONS

DE 19849492A1—Derwent Abstract.

* cited by examiner

*Primary Examiner*—J. Casimer Jacyna
(74) *Attorney, Agent, or Firm*—Jacob Fisenberg; Siemens AG

(57) ABSTRACT

The present invention relates to an actuating device with an electromotive rotary drive, via which an actuating element can be driven rotatably about an axis of rotation between a first end position and a second end position and can be acted upon out of the first end position by a spring. The electromotive actuating drive includes a reversing drive and the spring action upon the actuating element is effective between the first end position and an intermediate position. The spring action is ineffective between the intermediate position and the second end position. The intermediate position lies between the first end position and the second end position.

34 Claims, 3 Drawing Sheets

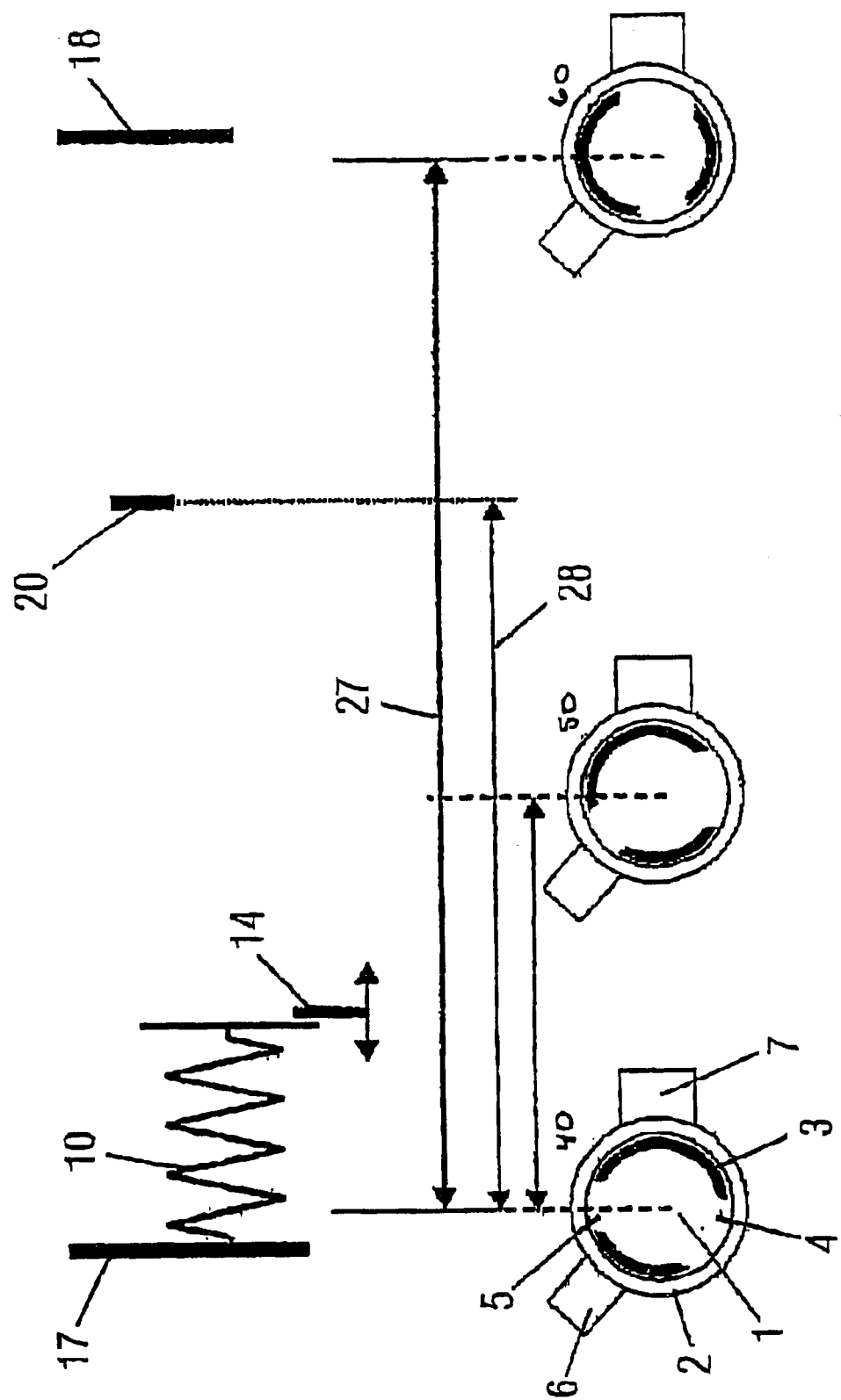

ACTUATING DEVICE

CROSS-REFERENCE TO RELATED APPLICATIONS

The present application claims priority to German patent application number 10243778.5 filed on 20 Sep. 2002, which is herein incorporated by reference.

BACKGROUND OF THE INVENTION

The present invention relates to an actuating device with an electromotive rotary drive and more particularly to the actuating element, which can be driven rotatably about an axis of rotation between a first end position and a second end position and further acted upon out of the first end position by a spring.

In actuating devices of this type, it is known to operate the actuating element by means of the electromotive rotary drive counter to the force of the spring and over the entire actuating travel between the first and second end positions. During operation of the actuating device, a permanent operation of the electromotive actuating drive is also required. A permanent supply of current and therefore a permanent expenditure of energy is also consequently necessary. Since, in this case, the activating electronics of the actuating drive is also operated permanently, the load on these electronics, particularly as a result of heating, is high and necessitates higher-grade electrical and electronic components, with the result that the activation electronics are costly.

If the actuating device serves for regulating the operation of a further device, such as, for example, for regulating the stream of a cooling liquid in a coolant circuit of the internal combustion engine for a motor vehicle, it is necessary that, in the event of a failure of the actuating device, a sufficient cooling liquid stream continues to be maintained, so that the internal combustion engine can be operated further, at least in an emergency running mode.

This is not possible with known actuating devices, since, in the event of failure, the actuating element is moved into the second end position by the spring. This means that the cooling circuit is either completely shut off or completely open, the both of which do not correspond to the cooling requirements.

BRIEF SUMMARY OF THE INVENTION

An object of the present invention is to provide an actuating device of the type initially mentioned above, which, in the event of a failure of its electromotive rotary drive, ensures that an intermediate position of the actuating element is assumed. The instant drive would operate with a saving of energy and further have a simple and cost-effective construction.

These and other objects are achieved by the present electromotive actuating drive. The present actuating device comprises a reversing drive. Spring action upon the actuating element is effective between the first end position and an intermediate position and is ineffective between the intermediate position and the second end position. The intermediate position lies between a first and a second end position.

Since the actuating element is adjusted and held counter to the force of the spring between the first end position and the middle position only, an increased expenditure of energy is necessary only in this actuating range. In the actuating range between the middle position and the second end position, the motive drive is necessary only in order to adjust the actuating element, without overcoming a spring force, but not in order to hold the actuating element in position. When the selected position is reached, the actuating drive is switched off, so that only low energy has to be expended for adjustment. No energy at all has to be expended for holding the element in an assumed position.

Since the spring acts only in a partial range of the total range of adjustment between the first and second end position, it can be designed with lower force, as a result of which only a smaller amount of energy is required for the electromotive rotary drive.

Thus, not only is the necessary energy requirement low, but also simpler and more cost-effective electrical and electronic components for activation and a motive rotary drive designed to be smaller may be used, since these parts are subjected to a lower thermal load.

At the same time, however, it is ensured that, in the event of a failure of the electromotive rotary drive, the actuating element is set automatically into an emergency running position.

In a simple and cost-effective design, the electromotive rotary drive may be a direct-current drive.

The actuating element may be arranged on a rotatably mounted shaft that can be rotatably driven by the electromotive actuating drive.

For the simple transmission of the rotary drive, the shaft has arranged on it, fixedly in terms of rotation, a gearwheel or toothed quadrant which can be rotatably driven by a drive pinion of the electromotive rotary drive directly or via one or more intermediate wheels.

A simply construction is achieved in that the first end position is determined by a first limit stop and/or the second end position is determined by a second limit stop. Accordingly, by means of the stops, the rotational movement of the gearwheel or toothed quadrant or of the actuating element or of a component connected to the gearwheel, toothed quadrant or actuating element, can be limited.

In this case, the ends of the toothed quadrant which are directed in the circumferential direction can be capable of butting up against the first and/or the second limit stop.

Only a few simple components are necessary for spring action upon the actuating element, between the first end position and the intermediate position, when a stop element mounted freely rotatably about the axis of rotation is acted upon by the spring. The actuating element can be taken along in the direction of the first end position on the gearwheel or toothed quadrant counter to the force of the spring. The rotatability of the stop element in the opposite direction is limited by an intermediate stop determining the intermediate position.

In this case, to achieve a further savings in terms of components, the stop element may have a driver which can be acted upon by the gearwheel or toothed quadrant in the direction of the first end position, and the stop element may have an intermediate-position stop which, in the intermediate position, is capable of butting up against the intermediate stop in the direction of the second end position.

If the stop element is a stop disk which is mounted freely rotatably on the shaft of the actuating element, only a small amount of installation space is necessary for this simply constructed component.

Likewise, only a small amount of installation space is necessary when the spring is a spiral spring having one end fixed and another end affixed to the stop element.

In this case, the spiral spring may act with its one end, in particular with its radially outer end, upon a spring driver of the stop element.

If the spiral spring surrounds the shaft, a compact construction is achieved.

There is a particular savings in terms of construction space when an actuating-device housing possesses a bowl-like recess. Into this recess one end of the shaft projects approximately coaxially. The spiral spring, the stop element, and the gearwheel or toothed quadrant may be arranged in a sandwich-like manner in the bowl-like recess.

In addition, the actuating-device housing may possess a motor chamber for receiving the electromotive rotary drive.

No separate components are required when the first limit stop and/or the second limit stop and/or the intermediate stop are arranged on the actuating-device housing.

The actuating element may be a rotary slide of a rotary-slide valve. The valve passage may be closed by means of a rotary slide. The slide may be driven rotatably, counter to the force of the spring, out of the closing position and into a partially open position. The slide may further be driven, free of a counterforce, out of the partially open position and into a fully open position. In this example, the partially open position may correspond to the intermediate position.

In the present example, in the event of failure of the electromotive rotary drive, when the slide is in the partially open or intermediate position, a sufficient flow of medium through the rotary-slide valve is maintained in order to ensure emergency operation of a flow dependent unit.

By means of the rotary slide, one or more further valve passages can be opened and/or can be shut off.

A simple construction is obtained when the rotary slide is mounted rotatably in a rotary-slide chamber of the actuating-device housing, and one or more flow inlets and/or flow outlets issuing into the rotary-slide chamber and being capable of being overlapped with one or more flow passages of the rotary slide. In this case, the flow inlets and/or flow outlets may issue into the rotary-slide chamber approximately radially and/or-approximately axially.

If the rotary-slide valve is a regulating valve in a coolant circuit of an internal combustion engine, then, in the event of a failure of the electromotive rotary drive, cooling of the internal combustion engine so as to ensure at least emergency operation is maintained. The maintenance is effectively simply. The coolant circuit, as is known in the art, may carry a cooling medium such as engine coolant liquid.

The present invention further comprises An actuating device, comprising: an electromotive rotary drive for driving an actuating element about an axis of rotation between a first and a second end position, a spring for acting upon said actuating element in said first end position, wherein said electromotive actuating drive is a reversing drive and said spring action upon said actuating element is effective between said first end position and an intermediate position and is further ineffective between said intermediate position and said second end position, the intermediate position lying between said first and second end position.

BRIEF DESCRIPTION OF THE SEVERAL VIEWS OF THE DRAWINGS

The novel features believed characteristic of the invention are set out in the claims below. The invention itself, however, as well as other features and advantages thereof, are best understood by reference to the detailed description, which follows, when read in conjunction with the accompanying drawing, wherein:

FIG. 3 depicts an illustration of the rotary-slide positions over the regulating range of the actuating device according to FIG. 1.

DETAILED DESCRIPTION OF THE INVENTION

Figure 1:
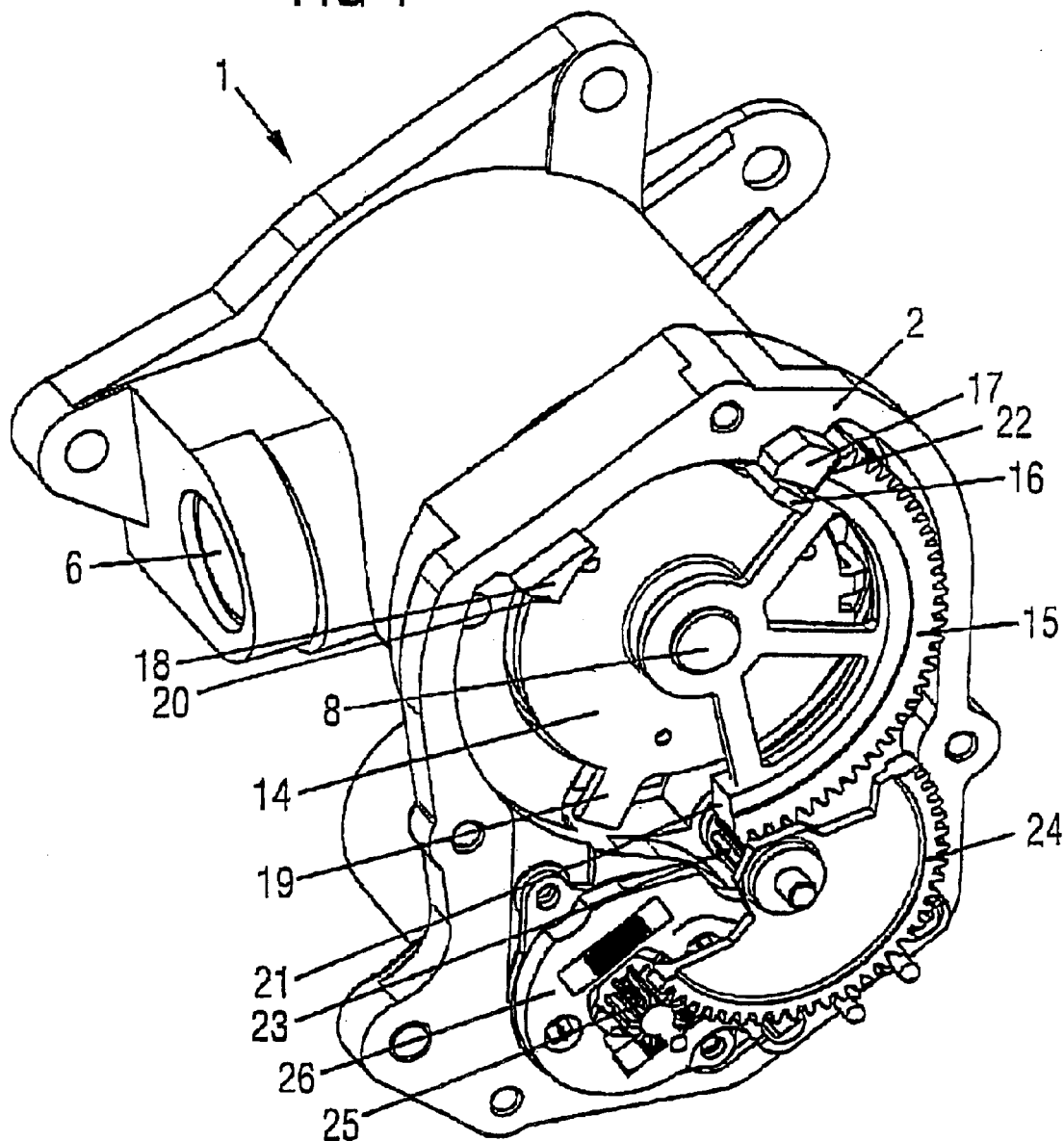
FIG. 1 depicts a perspective view of an actuating device of a rotary-slide valve.

The present invention will be described with respect to a rotary slide valve as being a regulating valve for an internal combustion engine coolant system. The present actuating device drives the rotary slide. For clarity purposes, details about the coolant system and internal combustion engine are not depicted. It is within the scope of the present invention that it find application beyond that discussed below.

As depicted in FIG. 3, the present regulating valve comprises a rotary slide 3 rotatably mounted in a rotary-slide chamber 1 of an actuating-device housing 2. The regulating valve includes two radial flow passages 4 and 5. The rotary chamber includes a short-circuit outlet 6 and a cooling outlet 7. The flow passages 4 and 5 are positioned on the rotary slide such that the slide 3, in a first position 40, shuts or seals off the rotary chamber to both outlets 6 and 7, and in a second position 50, the short-circuit outlet remains open, while the cooling outlet remains closed. In a still third position 60, it is the short-circuit outlet which remains closed while the cooling outlet is open.

Figure 2:
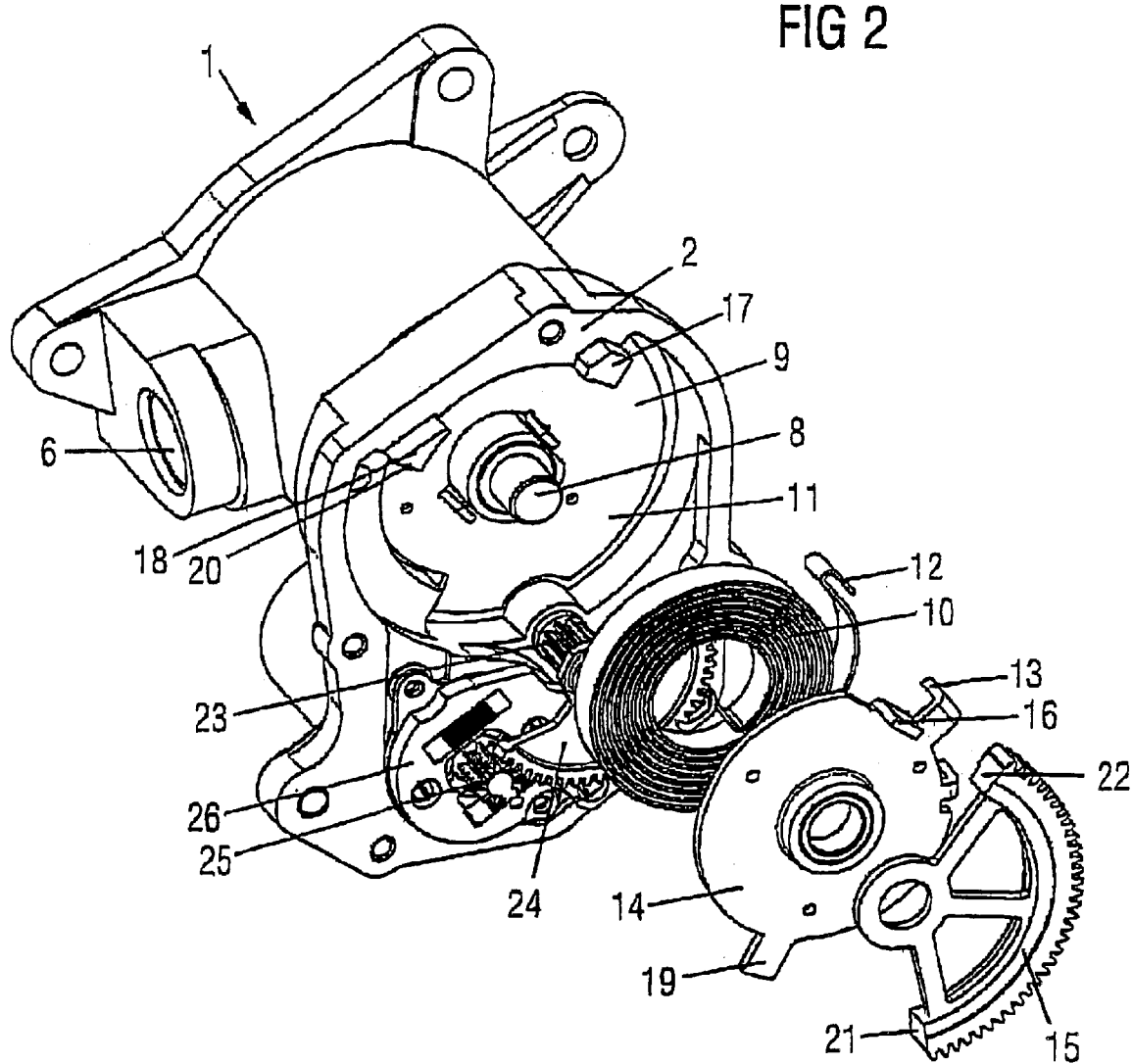
FIG. 2 depicts a perspective exploded illustration of the actuating device according to FIG. 1.

As depicted in FIGS. 1 and 2, the rotary slide chamber 1 comprises a bowl-like design. The chamber is axially connected with a flow inlet (not shown) via which coolant is supplied into the chamber. A corresponding orifice in the bottom of the chamber is included. A shaft 8 projects through the orifice. The shaft is fixedly connected to the rotary slide 3. The shaft is also coaxially connected to the slide. A first end of the shaft projects through the chamber bottom and a second end projects into recess 9. The recess 9 is also bowl-like. Actuating device housing 2 comprises recess 9.

The shaft 8 second end projecting from the recess is first surrounded by a spiral spring 10. The radially inner end of the spring 10 is arranged fixedly in the region of the bottom 11 of the recess 9. The radially outer end of spring 10 comprises a hook 12. A stop disk 14 is included. The stop disk 14 includes a spring driver 13 which is engaged by hook 12. The stop disk is freely and rotatably mounted on shaft 8, parallel to spiral spring 10.

A toothed quadrant 15 is fixedly connected to shaft 8 such that rotational movement from the shaft is imparted on the quadrant. The quadrant is also sandwiched with and arranged atop of stop disk 14. The stop disk 14 includes an axially directed driver 16. The driver projects into the path of movement of the toothed quadrant 15 and via which the stop disk 14, rotating until the toothed quadrant 15 comes to bear with one end 22 against a first limit stop 17, comes into bearing contact and the spiral spring 10 being tensioned. The first limit stop 17 is arranged fixedly on the actuating-device housing 2.

The toothed quadrant 15 can be rotated in the opposite direction of rotation until it comes to bear against a second limit stop 18. The stop disk 14 includes an intermediate-position stop 19 along its circumference. The stop disk 14, along with toothed quadrant 15 freely rotate about shaft 8, until stop 19 comes into contact with an intermediate stop 20. In FIG. 2, intermediate stop 20 is shown with second stop 18. The intermediate stop may be positioned elsewhere between first and second stops 17 and 18. When stop 19 comes into contact with stop 20, the stop disk 14 and toothed quadrant 15 are prevented from rotating further in the direction of travel.

However, since the intermediate-position stop 19 leads toothed quadrant end 21 in the direction facing second limit stop 18, the toothed quadrant 15 can still rotate further without the stop disk 14, before this rotational movement is limited by abutment against the second limit stop 18.

An intermediate pinion 23 engages toothed quadrant 15. The pinion is connected, fixed and coaxially, to intermediate wheel 24. Wheel 24, in turn is connected with drive pinion 25 of a reversibly drivable direct-current (DC) motor 26. The DC motor 26 is arranged in a motor chamber of the actuating-device housing 2. The aforementioned connections generally refer to toothed connections between the mentioned components. Other such connections envisioned by one skilled in the art would be applicable.

When the direct-current motor 26 is not operable or dead, the toothed quadrant 15 is moved by the spiral spring 10, via the stop disk 14, out of a position nearer to the first limit stop 17 and as far as into the intermediate position in which the intermediate-position stop 19 comes to bear against the intermediate stop 20. In this intermediate position, the rotary slide 3, co rotated via the shaft 8, is then in a partial opening position, in which the cooling outlet 7 is partially opened, so that cooling liquid can flow to the internal combustion engine and cool the latter.

If the cooling connection 7 is to be opened further and, if appropriate, completely, current is supplied to the direct-current motor 26 until the rotary slide 3 has reached the desired opening position. With the supply of current being terminated, the rotary slide 3 remains in this position. Due to the drive reversibility, the rotary slide 3 can be moved in both directions of rotation.

If the cooling outlet 7 is to be opened to a lesser extent than the partial opening position, current is supplied to the direct-current motor 26 in such a way that the toothed quadrant 15 moves with its end 22 in the direction of the first limit stop 17. Since, in this case, the stop disk 14 is taken along by the toothed quadrant 15 via the driver 16, the spiral spring 10 is also tensioned, so that its force also has to be overcome (see for example FIG. 1). This movement leads first to a further closing of the cooling outlet 7 up to the complete shut-off of the latter and to an opening of the short-circuit outlet (50). When the toothed quadrant 15 is rotated further toward the first limit stop 17, a shut-off of the short-circuit outlet 6 also takes place (40).

FIG. 3 depicts the various intermediate positions of the regulating valve over the entire range of adjustment 27 of the rotary slide 3. In this case, the illustration on the left (40) shows the fully closed position of both outlets 6 and 7, in which the direct-current motor 26, overcoming the force of the spiral spring 10, has moved the toothed quadrant 15 until it comes to bear against the first limit stop 17.

When the toothed quadrant 15 is driven out of this position and in the direction of the second limit stop 18, a rotation of the rotary slide 3 takes place. The slide rotation is effected with the cooperation of the spiral spring 10 over a range 28, short circuit operating range, and into the intermediate position. In the intermediate position, in which the short-circuit outlet 6 is then closed and the coolant outlet 7 is partially opened, the effective range of the spiral spring 28 ends.

From then on, an adjustment of the rotary slide 3 into its fully open position, in which the toothed quadrant 15 comes to bear against the second limit stop 18, may occur without a spring force having to be overcome.

The invention being thus described, it will be obvious that the same may be varied in many ways. The variations are not to be regarded as a departure from the spirit and scope of the invention, and all such modifications as would be obvious to one skilled in the art are intended to be included within the scope of the following claims.

We claim:

1. An actuating device, comprising:
   an electromotive rotary drive for driving an actuating element about an axis of rotation between a first and a second end position,
   a spring for acting upon said actuating element in said first end position, wherein said electromotive actuating drive is a reversing drive and said spring action upon said actuating element is effective between said first end position and an intermediate position and is further ineffective between said intermediate position and said second end position, the intermediate position lying between said first and second end position.

2. The actuating device according to claim 1, wherein said electromotive actuating drive is a direct-current drive.

3. The actuating device according to claim 1, further comprising a rotatable shaft arranged within said actuating element, said shaft being driven by said actuating drive.

4. The actuating device according to claim 3, further comprising a gearwheel affixed to said shaft and a drive pinion affixed to said actuating drive and functionally associated with said wheel so as to rotatably drive said wheel.

5. The actuating device according to claim 3, further comprising a toothed quadrant affixed to said shaft and a drive pinion affixed to said actuating drive and functionally associated with said wheel so as to rotatably drive said wheel.

6. The actuating device according to claim 3, further comprising:
   a gearwheel affixed to said shaft, and
   a drive pinion affixed to said rotary drive, said pinion being functionally associated with said gearwheel so as to drive said gearwheel.

7. The actuating device according to 6 further comprising at least one intermediate wheel functionally positioned between said drive pinion and said gearwheel, such that said pinion directly drives said at least one intermediate wheel which in turn directly drives said gearwheel.

8. The actuating device according to claim 3, further comprising:
   a toothed quadrant affixed to said shaft, and
   a drive pinion affixed to said rotary drive, said pinion driving functionally associated with said toothed quadrant so as to drive said toothed quadrant.

9. The actuating device according to 8 further comprising at least one intermediate wheel functionally positioned between said drive pinion and said toothed quadrant, such that said pinion directly drives said at least one intermediate wheel which in turn directly drives said toothed quadrant.

10. The actuating device according to claim 4, further comprising a first and a second limit stop, said first and second limit stop positioned on said device so as to limit rotational movement of said gearwheel.

11. The actuating device according to claim 5, further comprising a first and a second limit stop, said first and second limit stop positioned on said device so as to limit rotational movement of said toothed quadrant.

12. The actuating device according to claim 1, further comprising a first and a second limit stop, said first and second limit stop positioned on said device so as to limit rotational movement of said actuating element.

13. The actuating device according to claim 1, further comprising a first and a second limit stop, said first and second limit stop positioned on said device so as to limit rotational movement of a component functionally associated with said first and second limit stop.

14. The actuating device according to claim 11, wherein said toothed quadrant further comprises a first and a second end positioned proximate to said first and second limit stop respectively, such that when said toothed quadrant is rotated in a direction of one of said first and second limit stops, a respective one of said first and second ends abuts a respective stop thereby halting rotational motion of said toothed quadrant.

15. The actuating device according to claim 1, further comprising:
  a stop element rotatably mounted with one of a gearwheel and a toothed quadrant about said axis of rotation;
  a spring functionally associated with said stop element so as to impart rotational energy on said stop element in a direction of said second end position and against rotational energy imparted by at least one of said gearwheel and toothed quadrant on said stop element; and
  an intermediate limit stop positioned between said first and second end positions, said intermediate limit stop limiting rotation of said stop element.

16. The actuating device according to claim 15, wherein said stop element is a stop disk.

17. The actuating device according to claim 15, wherein said intermediate limit stop limits angular rotation of said stop element in a direction of said second end.

18. The actuating device as claimed in claim 15, wherein said stop element further comprises a driver which can be acted upon in a direction of said first end position by one of said gearwheel or toothed quadrant.

19. The actuating device according to claim 15, wherein said stop element comprises an intermediate position stop for abutting said intermediate limit stop when said stop element is in an intermediate position.

20. The actuating device according to claim 15, wherein said stop element is mounted on a shaft at least partially housed within said actuating element.

21. The actuating device according to claim 15, wherein said spring is a spiral spring, having one end affixed to said device and another end affixed to said stop element.

22. The actuating device according to claim 21, wherein said stop element further comprises a spring driver for engaging said spring.

23. The actuating device according to claim 21, wherein said spring surrounds a shaft at least partially housed in said actuating device.

24. The actuating device according to claim 15, further comprising:
  an actuating-device housing comprising a bowl-like recess,
  at least one of a gearwheel and a toothed quadrant,
  a shaft having one end extending into said housing and a second end extending from said housing, said shaft being approximately perpendicular with said housing, and
  wherein said shaft, said stop element, and said at least one of a gearwheel and a toothed quadrant are sandwiched within said recess.

25. The actuating device as claimed in claim 24, wherein said housing further comprises a motor chamber for accommodating said electromotive rotary drive.

26. The actuating device according to claim 24, further comprising a first and a second limit stop wherein said first and second limit stop and said intermediate stop are arranged on said housing.

27. The actuating device according to claim 1, wherein said actuating element is a rotary slide of a rotary slide valve, said valve comprising a valve passage closable by said rotary slide, said rotary slide being rotatably driven counter to a force direction of said spring from a valve closing position to a valve partially open position, and being further rotatably driven out of said partially open position to a fully open position.

28. The actuating device according to 27, wherein said partially open position is an intermediate position.

29. The actuating device according to claim 27, wherein said valve comprises a plurality of passages and said rotary slide further comprises means for closing off at least one of said plurality of passages.

30. The actuating device according to claim 29, further comprising a chamber for housing said rotary slide rotatably mounted therein, said chamber being located in said housing and comprising at least one flow inlet and flow outlet, said at least one flow inlet and flow outlet selectively overlapped with one or more flow passages of said rotary slide.

31. The actuating device according to claim 30, wherein said at least one flow inlet and flow outlet run into said rotary-slide chamber approximately radially and/or approximately axially.

32. The actuating device according to claim 27, wherein said rotary-slide valve is a regulating valve in a coolant circuit of an internal combustion engine, and said coolant circuit carrying cooling medium.

33. The actuating device according to claim 32, wherein said cooling medium is cooling liquid.

34. The actuating device according to claim 15, wherein said toothed quadrant is rotatable when said stop disk is stationary or rotating.

* * * * *